United States Patent
Ren et al.

(10) Patent No.: US 8,680,492 B2
(45) Date of Patent: Mar. 25, 2014

(54) LIGHT GUIDE PLATE AND BACKLIGHT MODULE UTILIZING ULTRAVIOLET LIGHT SOURCE

(75) Inventors: Jie Ren, Guangdong (CN); Po-iem Lin, Guangdong (CN); Gang Yu, Guangdong (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 13/203,738

(22) PCT Filed: Jun. 20, 2011

(86) PCT No.: PCT/CN2011/075958
§ 371 (c)(1),
(2), (4) Date: Aug. 29, 2011

(87) PCT Pub. No.: WO2012/155377
PCT Pub. Date: Nov. 22, 2012

(65) Prior Publication Data
US 2014/0054473 A1     Feb. 27, 2014

(30) Foreign Application Priority Data
May 19, 2011 (CN) .................. 2011 2 0162872 U

(51) Int. Cl.
*G01J 3/12* (2006.01)
(52) U.S. Cl.
USPC ....... 250/504 R; 362/600; 362/608; 362/610; 362/615

(58) Field of Classification Search
USPC .............. 250/504 R; 362/600, 608–615
See application file for complete search history.

(56) References Cited

U.S. PATENT DOCUMENTS
2006/0039167 A1 *  2/2006  Hsueh et al. ............ 362/614

FOREIGN PATENT DOCUMENTS

| | | | |
|---|---|---|---|
| CN | 101482247 A | | 7/2009 |
| CN | 101546063 A | | 9/2009 |
| CN | 101625076 A | * | 1/2010 |
| JP | 10-154830 A | | 6/1998 |
| JP | 2000-113709 A | | 4/2000 |
| JP | 2003-100126 A | * | 4/2003 |
| JP | 2003-100126 A | | 4/2003 |
| JP | 2005-183139 A | | 7/2005 |

* cited by examiner

*Primary Examiner* — Michael Maskell
(74) *Attorney, Agent, or Firm* — Mark M. Friedman

(57) ABSTRACT

A light guide plate comprises a light incidence surface for receiving light rays; a transforming fluorescent powder disposed on the light incidence surface for converting the light rays into white rays; a reflection surface for reflecting the light rays and destroying total internal reflection formed inside the light guide plate to generate planar light rays; a light emitting surface for emitting the planar light rays; and a lateral reflection surface disposed away from the light incidence surface for reflecting the light rays from the light incidence surface and the reflection surface; the lateral reflection surface having a compensative fluorescent powder disposed thereon for adjusting a color of the planar light rays. The light guide plate can reduce the backlight color difference for a panel of a single-end incident type to improve visual quality level and the quality of products.

15 Claims, 1 Drawing Sheet

LIGHT GUIDE PLATE AND BACKLIGHT MODULE UTILIZING ULTRAVIOLET LIGHT SOURCE

TECHNICAL FIELD OF THE INVENTION

The present invention relates to a light guide plate and a backlight module, and more particularly, to a light guide plate and a backlight module utilizing an ultraviolet light source capable of reducing backlight color difference caused by light incidence at a single end.

BACKGROUND OF THE INVENTION

In a sidelight-type backlight module, a cold cathode fluorescent lamp (CCFL) or a light emitting diode (LED) is currently adopted for serving as a light source. To satisfy the requirement of developing thinning devices, a large scale backlight module has been gradually designed to be incident by light rays at a single end. The single-end incident type becomes a design tendency as the emitting efficiency of the light source is improved. However, there are problems accompanied as well. FIG. 1 is a schematic diagram showing a structure of a conventional light guide plate. The light guide plate 100 shown in FIG. 1 comprises a light incidence surface 101, a reflection surface 102, a light emitting surface 102, and a lateral reflection surface 104. The light source 110 in FIG. 1 is an ultraviolet light source. After the light rays emitted from the light source 110 enters the light guide plate 100 via the light incidence surface 101, the light rays are converted to white rays by a transforming fluorescent powder 111, wherein the transforming fluorescent powder 111 is a mixture of a yellow-ray fluorescent powder and a blue-ray fluorescent powder. The total internal reflection formed by the converted white rays is then destroyed by optical microstructures 105 on the reflection surface 102 and the rays are emitted from the light emitting surface 103. However, when the light rays are propagated in the light guide plate, the light rays encountering the optical microstructures 105 will be scattered for each collision and at the same time a part of energy of the light rays will be absorbed. Therefore, the spectrum of the light rays will be changed for each time the light rays are scattered. When the light rays are propagated from an end of the light guide plate 100 to the other end, the color of the light rays is gradually altered. In the conventional sidelight-type backlight module, the optical microstructures 105 of the light guide plate 100 can be formed into a printed type and a non-printed type. An ink on the printed-type optical microstructures 105 mainly absorbs short-wavelength light rays emitted from the light source 110, and therefore a color degree of the light rays will become large (that is, the color will deviate to a yellow color) when the light rays are propagated to an end away from the light incidence surface 101. A panel color difference will be occurred eventually. That is, the color of respective points is non-uniform at a backlight side. The bigger is the size of the light guide plate, more apparent is the color difference. This may seriously affect visual quality level and the quality of products. The non-printed-type light guide plate is a light guide plate adopting microstructures made of methylmethacrylate styrene (MS) or other materials. The MS material or the other material itself will absorb short-wavelength light rays and will cause the panel color difference as well.

Therefore, it is necessary to provide a light guide plate and a backlight module utilizing an ultraviolet light source for solving the problems in the conventional skills.

SUMMARY OF THE INVENTION

The main objective of the present invention is to provide a light guide plate and a backlight module utilizing an ultraviolet light source for solving the problem of non-uniform color of respective points on a backlight side.

The technical schemes provided in the present invention are described below.

A light guide plate, comprising:
a light incidence surface for receiving light rays; a transforming fluorescent powder disposed at a side of the light incidence surface for converting the light rays into white rays; a reflection surface for reflecting the light rays received by the light incidence surface and destroying total internal reflection formed inside the light guide plate, by the light rays received by the light incidence surface, to generate planar light rays; a light emitting surface for emitting the planar light rays; and a lateral reflection surface disposed away from an end of the light incidence surface for reflecting the light rays coming from the light incidence surface and the reflection surface;

the lateral reflection surface has a compensative fluorescent powder disposed thereon for adjusting a color of the planar light rays emitted from the light emitting surface;

the compensative fluorescent powder is doped in a body of the lateral reflection surface; or the lateral reflection surface has a transparent film attached at an inner side of the lateral reflection surface and the transparent film is coated with the compensative fluorescent powder; or the lateral reflection surface has the transparent film attached at the inner side of the lateral reflection surface and the compensative fluorescent powder is doped in the transparent film;

the lateral reflection surface has at least one angle formed thereon.

The present invention also provides a light guide plate, said light guide plate comprising: a light incidence surface for receiving light rays; a transforming fluorescent powder disposed at a side of the light incidence surface for converting the light rays into white rays; a reflection surface for reflecting the light rays received by the light incidence surface and destroying total internal reflection formed inside the light guide plate, by the light rays received by the light incidence surface, to generate planar light rays; a light emitting surface for emitting the planar light rays; and a lateral reflection surface disposed away from an end of the light incidence surface for reflecting the light rays coming from the light incidence surface and the reflection surface; the lateral reflection surface has a compensative fluorescent powder disposed thereon for adjusting a color of the planar light rays emitted from the light emitting surface.

The present invention further provides a backlight module, said backlight module comprising a light guide plate and an ultraviolet light source, said light guide plate comprising: a light incidence surface for receiving light rays; a transforming fluorescent powder disposed at a side of the light incidence surface for converting the light rays into white rays; a reflection surface for reflecting the light rays received by the light incidence surface and destroying total internal reflection formed inside the light guide plate, by the light rays received by the light incidence surface, to generate planar light rays; a light emitting surface for emitting the planar light rays; and a lateral reflection surface disposed away from an end of the light incidence surface for reflecting the light rays coming from the light incidence surface and the reflection surface; the lateral reflection surface having a compensative fluorescent powder disposed thereon for adjusting a color of the planar light rays emitted from the light emitting surface; the light source being disposed at a side of the light incidence surface of the light guide plate for emitting the light rays toward the light incidence surface.

In one embodiment of the present invention, the compensative fluorescent powder is doped in a body of the lateral reflection surface and/or the transforming fluorescent powder is doped in a body of the light incidence surface.

In one embodiment of the present invention, the lateral reflection surface has a transparent film attached at an inner side of the lateral reflection surface and the transparent film is coated with the compensative fluorescent powder; and/or the light incidence surface has a transparent film attached at an inner side of the light incidence surface and the transparent film is coated with the transforming fluorescent powder.

In one embodiment of the present invention, the lateral reflection surface has a transparent film attached at an inner side of the lateral reflection surface and the compensative fluorescent powder is doped in the transparent film; and/or the light incidence surface has a transparent film attached at an inner side of the light incidence surface and the transforming fluorescent powder is doped in the transparent film.

In one embodiment of the present invention, the compensative fluorescent powder comprises a blue-ray fluorescent powder; the transforming fluorescent powder comprises a yellow-ray fluorescent powder and a blue-ray fluorescent powder.

In one embodiment of the present invention, the lateral reflection surface has at least one angle formed thereon.

In one embodiment of the present invention, the light guide plate is a light guide plate having microstructures made of methylmethacrylate styrene (MS).

In one embodiment of the present invention, the light emitting surface has a brightness enhancement film disposed at a side of the light emitting surface for increasing light emitting efficiency, In one embodiment of the present invention, the reflection surface has a reflecting unit disposed at a side of the reflection surface for increasing light reflecting efficiency.

Compared to the conventional light guide plate and backlight module of a single-end incident type, the light guide plate and backlight module of the present invention utilizes the compensative fluorescent powder to be coated on the lateral reflection surface of the light guide plate so as to reduce the backlight color difference for a panel of the single-end incident type to achieve a better visual quality level and improve the quality of products.

BRIEF DESCRIPTION OF THE DRAWINGS

The present invention will be described in details in conjunction with the appending drawings.

DETAILED DESCRIPTION OF THE INVENTION

The following descriptions for the respective embodiments are specific embodiments capable of being implemented for illustrations of the present invention with referring to appended figures. For example, the terms of up, down, front, rear, left, right, interior, exterior, side, etcetera are merely directions of referring to appended figures. Therefore, the wordings of directions are employed for explaining and understanding the present invention but not limitations thereto.

Figure 1:
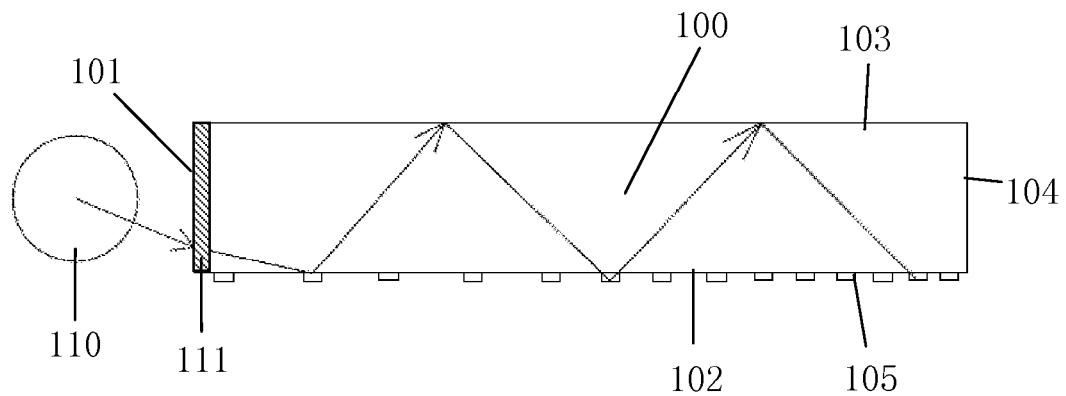
FIG. 1 is a schematic diagram showing a structure of a conventional light guide plate.
Figure 2:
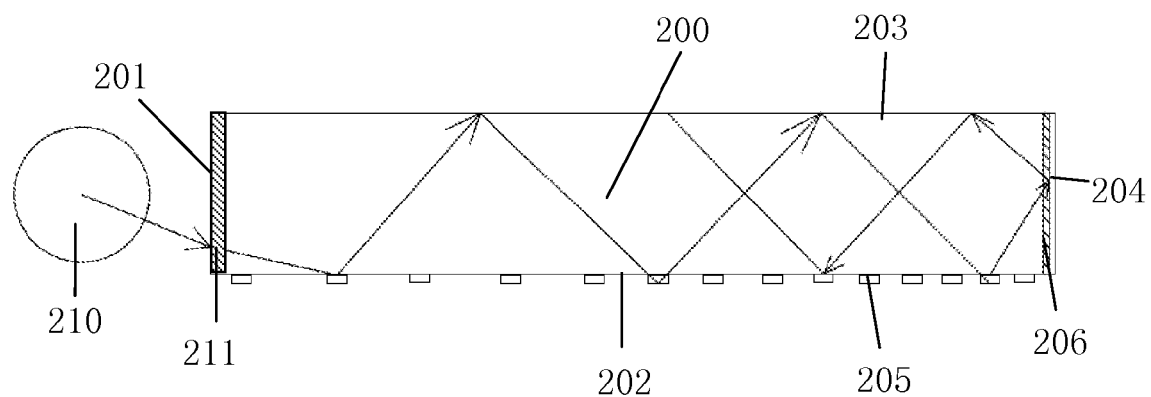
FIG. 2 is a schematic diagram showing a structure of a light guide plate in accordance with a first preferred embodiment of the present invention.

FIG. 2 is a schematic diagram showing a structure of a light guide plate in accordance with a first preferred embodiment of the present invention. Referring to FIG. 2, the backlight module of the present invention is a sidelight-type backlight module. The backlight module comprises a light guide plate 200 and a light source 210. The light source 210 is an ultraviolet light source, for example, a cold cathode fluorescent lamp (CCFL), a light emitting diode (LED), an organic light emitting diode (OLED), an electro-luminescence (EL) component, and any combination of above light sources. The light guide plate 200 comprises a light incidence surface 201, a reflection surface 202, a light emitting surface 203, and a lateral reflection surface 204. The light incidence surface 201 is utilized for receiving light rays; the reflection surface 202 is utilized for reflecting the light rays received by the light incidence surface 201 and destroying total internal reflection formed inside the light guide plate 200, by the light rays received by the light incidence surface 201, to generate planar light rays; the light emitting surface 203 is utilized for emitting the planar light rays; the lateral reflection surface 204 is disposed away from an end of the light incidence surface 201 for reflecting the light rays coming from the light incidence surface 201 and the reflection surface 202; a transforming fluorescent powder 211 is disposed at a side of the light incidence surface 201 for converting the light rays into white rays; the lateral reflection surface 204 has a compensative fluorescent powder 206 disposed thereon for adjusting a color of the planar light rays emitted from the light emitting surface 203.

The light guide plate and backlight module of the present invention is to solve the problem of backlight color difference caused by light incidence at a single end in the conventional light guide plate and backlight module. In the schematic structure diagram of the light guide plate as shown in FIG. 2 in accordance with the first preferred embodiment of the present invention, the lateral reflection surface 204 of the light guide plate 200 is coated with the compensative fluorescent powder 206. The compensative fluorescent powder 206 is mainly a fluorescent powder capable of exciting light rays and generating short-wavelength light rays such that a larger amount of short-wavelength light rays will be generated when the light rays passed over encounter the compensative fluorescent powder 206. The short-wavelength light rays are then reflected back to compensate a part of short-wavelength light rays absorbed by an ink of optical microstructures 205. A color compensation manner is utilized such that the color of the emitted light rays away from the light source 210 is compensated.

For a preferred embodiment of the present invention, the compensative fluorescent powder 206 can be doped in a body of the lateral reflection surface 204. That is, based on a predetermined proportion, the compensative fluorescent powder 206 is mixed into a plastic material or other material used for manufacturing the body of the lateral reflection surface 204, and is distributed in the body of the lateral reflection surface 204 by an injection molding manner. It also can utilize a transparent film to attach at an inner side of the lateral reflection surface 204. The transparent film is coated with the compensative fluorescent powder 206 or the compensative fluorescent powder 206 is doped in the transparent film. The coating manner can be implemented by mixing the compensative fluorescent powder 206 into a chemical solvent and then spraying the chemical solvent on the lateral reflection surface 204 by an ink-jetting manner or directly coating the compensative fluorescent powder 206 on the transparent film. The manner for doping the compensative fluorescent powder 206 in the transparent film can be implemented by mixing the compensative fluorescent powder 206 and a transparent material by a heat treatment such that a doped film is formed after cooling. As desired, a user can choose an appropriate manner to dispose the compensative fluorescent powder 206 on the lateral reflection surface 204. The above manners also can be adopted to dispose the transforming fluorescent powder 211 on a side of the light incidence surface.

At present, the ink on the optical microstructures 205 mainly absorbs short-wavelength light rays that are emitted from the light source 210. Therefore, for a preferred embodiment of the present invention, the adopted compensative fluorescent powder 206 comprises a blue-ray fluorescent powder such that a larger amount of short-wavelength light rays will be generated when the light rays passed over encounter the blue-ray fluorescent powder. The short-wavelength light rays are then reflected back to compensate a part of short-wavelength light rays absorbed by the ink of the optical microstructures 205. A color compensation manner is utilized such that the color of the emitted light rays away from the light source 210 is compensated. The compensative fluorescent powder 206 coated on the lateral reflection surface 204 can be adjusted to different proportions according to different sizes of the light guide plate. When the size of the light guide plate 210 with single-end incidence is bigger, it needs to dispose more blue-ray fluorescent powder to compensate short-wavelength light rays. Otherwise, the light rays go further when the light guide plate 210 is bigger, and the color difference of panel will become more serious. The transforming fluorescent powder mainly comprises a yellow-ray fluorescent powder and a blue-ray fluorescent powder, and their corresponding proportion can be set according to the wavelengths emitted by the ultraviolet light source for generating the required white rays.

Above all, it belongs to the protective scope of the present invention as long as the lateral reflection surface 204 has the compensative fluorescent powder 206 disposed thereon for reducing the backlight color difference for a panel of the single-end incident type, no matter what manner is adopted to dispose the compensative fluorescent powder 206 on the lateral reflection surface 204.

Figure 3:
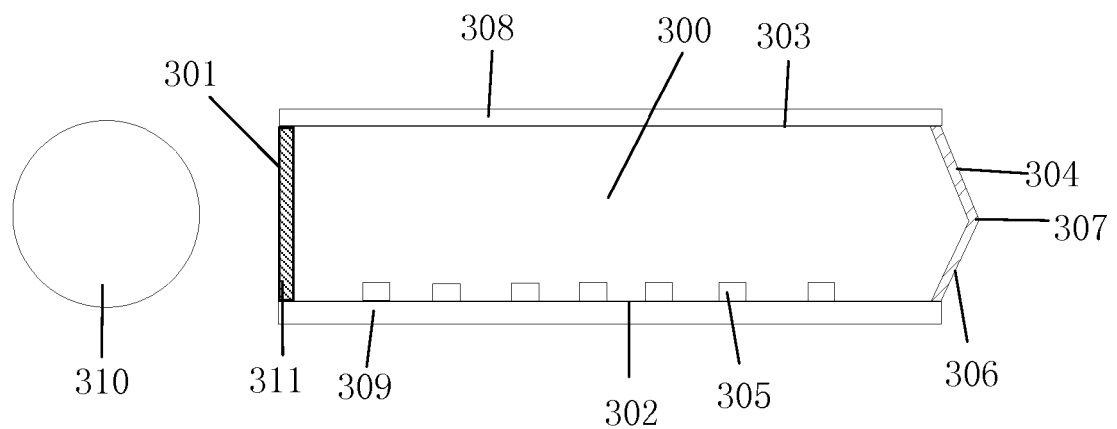
FIG. 3 is a schematic diagram showing a structure of a light guide plate in accordance with a second preferred embodiment of the present invention.

FIG. 3 is a schematic diagram showing a structure of a light guide plate in accordance with a second preferred embodiment of the present invention. The light guide plate 300 comprises a light incidence surface 301, a reflection surface 302, a light emitting surface 303, and a lateral reflection surface 304. The light incidence surface 301 is utilized for receiving light rays; the reflection surface 302 is utilized for reflecting the light rays received by the light incidence surface 301 and destroying total internal reflection formed inside the light guide plate 300, by the light rays received by the light incidence surface 301, to generate planar light rays; the light emitting surface 303 is utilized for emitting the planar light rays; the lateral reflection surface 304 is disposed away from an end of the light incidence surface 301 for reflecting the light rays coming from the light incidence surface 301 and the reflection surface 302; a transforming fluorescent powder 311 is disposed at a side of the light incidence surface 301 for converting the light rays into white rays; the lateral reflection surface 304 has a compensative fluorescent powder 306 disposed thereon for adjusting a color of the planar light rays emitted from the light emitting surface 303. Further, the lateral reflection surface 304 has at least one angle 307 formed thereon. As can be deduced from a law of reflection, the deflected angle of a light ray will be large when the angle 307 is small; the deflected angle of a light ray will be small when the angle 307 is large. By angular designs of the light incidence surface 301, the reflection surface 302, the light emitting surface 303, and the lateral reflection surface 304 on the light guide plate 300, particularly by the angle 307 designed on the lateral reflection surface 304, the emitting angle of light rays can be effectively adjusted and thereby increasing the light emitting efficiency of the light guide plate 300. The design of the angle, such as number, shape, and etc. can be altered according to the light emitting efficiency, and the present invention is not limited thereto. It belongs to the protective scope of the present invention as long as the lateral reflection surface 304 has the compensative fluorescent powder 306 disposed thereon for reducing the backlight color difference for a panel of the single-end incident type. The light emitting surface 303 has a brightness enhancement film 308 disposed at a side of the light emitting surface 303 for increasing the light emitting efficiency. The reflection surface 302 has a reflecting unit 309 disposed at a side of the reflection surface 302 for increasing the light reflecting efficiency. As shown in FIG. 3, the reflecting unit 309 is used to reflect the light rays downwardly penetrating the light guide plate 300 back to the light guide plate 300 for increasing the utilization rate of light rays. The brightness enhancement film 308 is disposed at a side of the light emitting surface 303 for increasing the light emitting efficiency of the light guide plate 300.

In the second preferred embodiment of the present invention, the compensative fluorescent powder 306 can be doped in a body of the lateral reflection surface 304. That is, based on a predetermined proportion, the compensative fluorescent powder 306 is mixed into a plastic material or other material used for manufacturing the body of the lateral reflection surface 304, and is distributed in the body of the lateral reflection surface 304 by an injection molding mariner. It also can utilize a transparent film to attach at an inner side of the lateral reflection surface 304. The transparent film is coated with the compensative fluorescent powder 306 or the compensative fluorescent powder 306 is doped in the transparent film. The coating manner can be implemented by mixing the compensative fluorescent powder 306 into a chemical solvent and then spraying the chemical solvent on the lateral reflection surface 304 by an ink-jetting manner or directly coating the compensative fluorescent powder 306 on the transparent film. The manner for doping the compensative fluorescent powder 306 in the transparent film can be implemented by mixing the compensative fluorescent powder 306 and a transparent material by a heat treatment such that a doped film is formed after cooling. As desired, a user can choose an appropriate manner to dispose the compensative fluorescent powder 306 on the lateral reflection surface 304. The above manners also can be adopted to dispose the transforming fluorescent powder 311 on a side of the light incident surface.

For the preferred embodiment of the present invention, the light guide plate is a light guide plate having microstructures made of methylmethacrylate styrene (MS). The light guide plate of the present invention can be implemented by a light guide plate made of other non-printed type of materials, such as a light guide plate having MS microstructures. The main reason why the light guide plate having the MS material causes the color difference is that the MS material itself will absorb short-wavelength light rays. Therefore, for this instance, the structure of the light guide plate of the present invention also can be utilized to solve the color difference in a panel and improve the visual quality level and the quality of products.

The present invention also relates to a backlight module. The backlight module comprises a light guide plate and an ultraviolet light source. The light guide plate comprises a light incidence surface for receiving light rays; a transforming fluorescent powder disposed at a side of the light incidence surface for converting the light rays into white rays; a reflection surface for reflecting the light rays received by the light incidence surface and destroying total internal reflection formed inside the light guide plate, by the light rays received by the light incidence surface, to generate planar light rays; a light emitting surface for emitting the planar light rays; and a lateral reflection surface disposed away from an end of the light incidence surface for reflecting the light rays coming from the light incidence surface and the reflection surface; the lateral reflection surface having a compensative fluorescent powder disposed thereon for adjusting a color of the planar light rays emitted from the light emitting surface; the ultraviolet light source being disposed at a side of the light incidence surface of the light guide plate for emitting the light rays toward the light incidence surface.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A light guide plate, comprising:
a light incidence surface for receiving light rays;
a transforming fluorescent powder disposed at a side of the light incidence surface for converting the light rays into white rays;
a reflection surface for reflecting the light rays received by the light incidence surface and destroying total internal reflection formed inside the light guide plate, by the light rays received by the light incidence surface, to generate planar light rays;
a light emitting surface for emitting the planar light rays; and
a lateral reflection surface disposed away from an end of the light incidence surface for reflecting the light rays coming from the light incidence surface and the reflection surface;
characterized in that:
the lateral reflection surface has a compensative fluorescent powder disposed thereon for adjusting a color of the planar light rays emitted from the light emitting surface;
the compensative fluorescent powder is doped in a body of the lateral reflection surface; or
the lateral reflection surface has a transparent film attached at an inner side of the lateral reflection surface and the transparent film is coated with the compensative fluorescent powder; or
the lateral reflection surface has the transparent film attached at the inner side of the lateral reflection surface and the compensative fluorescent powder is doped in the transparent film;
the lateral reflection surface has at least one angle formed thereon.

2. A light guide plate, comprising:
a light incidence surface for receiving light rays;
a transforming fluorescent powder disposed at a side of the light incidence surface for converting the light rays into white rays;
a reflection surface for reflecting the light rays received by the light incidence surface and destroying total internal reflection formed inside the light guide plate, by the light rays received by the light incidence surface, to generate planar light rays;
a light emitting surface for emitting the planar light rays; and
a lateral reflection surface disposed away from an end of the light incidence surface for reflecting the light rays coming from the light incidence surface and the reflection surface;
characterized in that:
the lateral reflection surface has a compensative fluorescent powder disposed thereon for adjusting a color of the planar light rays emitted from the light emitting surface.

3. The light guide plate according to claim 2, characterized in that the compensative fluorescent powder is doped in a body of the lateral reflection surface.

4. The light guide plate according to claim 2, characterized in that the lateral reflection surface has a transparent film attached at an inner side of the lateral reflection surface and the transparent film is coated with the compensative fluorescent powder.

5. The light guide plate according to claim 2, characterized in that the lateral reflection surface has a transparent film attached at an inner side of the lateral reflection surface and the compensative fluorescent powder is doped in the transparent film.

6. The light guide plate according to claim 2, characterized in that the compensative fluorescent powder comprises a blue-ray fluorescent powder.

7. The light guide plate according to claim 2, characterized in that the lateral reflection surface has at least one angle formed thereon.

8. The light guide plate according to claim 2, characterized in that the light guide plate is a light guide plate having microstructures made of methylmethacrylate styrene.

9. The light guide plate according to claim 2, characterized in that the light emitting surface has a brightness enhancement film disposed at a side of the light emitting surface for increasing light emitting efficiency.

10. The light guide plate according to claim 2, characterized in that the reflection surface has a reflecting unit disposed at a side of the reflection surface for increasing light reflecting efficiency.

11. A backlight module, characterized in that the backlight module comprises a light guide plate and an ultraviolet light source,
said light guide plate comprising:
a light incidence surface for receiving light rays;
a transforming fluorescent powder disposed at a side of the light incidence surface for converting the light rays into white rays;
a reflection surface for reflecting the light rays received by the light incidence surface and destroying total internal reflection formed inside the light guide plate, by the light rays received by the light incidence surface, to generate planar light rays;
a light emitting surface for emitting the planar light rays; and a lateral reflection surface disposed away from an end of the light incidence surface for reflecting the light rays coming from the light incidence surface and the reflection surface;

the lateral reflection surface having a compensative fluorescent powder disposed thereon for adjusting a color of the planar light rays emitted from the light emitting surface;

the ultraviolet light source being disposed at a side of the light incidence surface of the light guide plate for emitting the light rays toward the light incidence surface.

12. The backlight module according to claim 11, characterized in that the compensative fluorescent powder is doped in a body of the lateral reflection surface.

13. The backlight module according to claim 11, characterized in that the lateral reflection surface has a transparent film attached at an inner side of the lateral reflection surface and the transparent film is coated with the compensative fluorescent powder.

14. The backlight module according to claim 11, characterized in that the lateral reflection surface has a transparent film attached at an inner side of the lateral reflection surface and the compensative fluorescent powder is doped in the transparent film.

15. The backlight module according to claim 11, characterized in that the lateral reflection surface has at least one angle formed thereon.

\* \* \* \* \*